April 19, 1960 H. R. DYE 2,933,210
CONTAINER HANDLING AND DUMPING APPARATUS
Filed Dec. 4, 1958 4 Sheets-Sheet 2
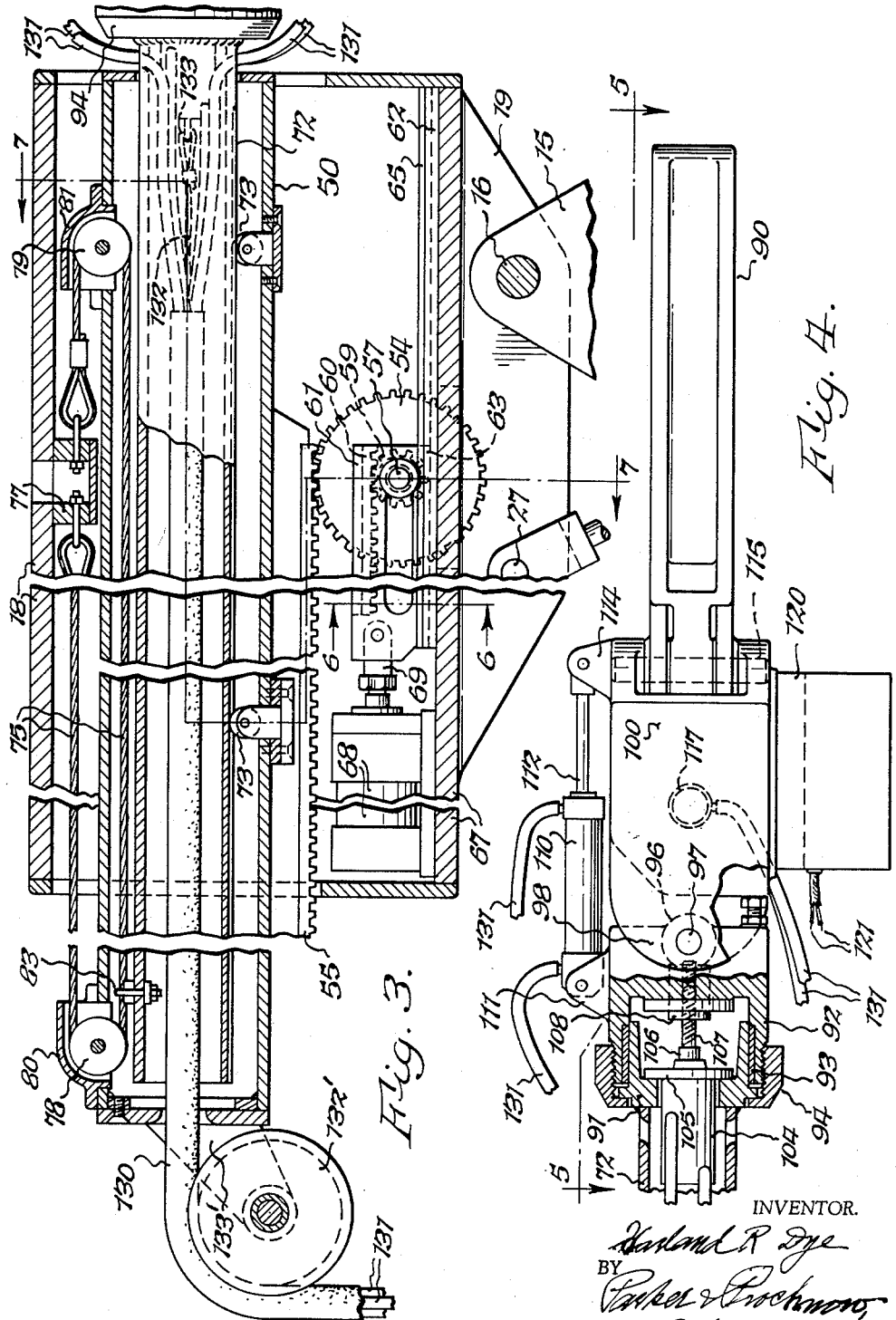

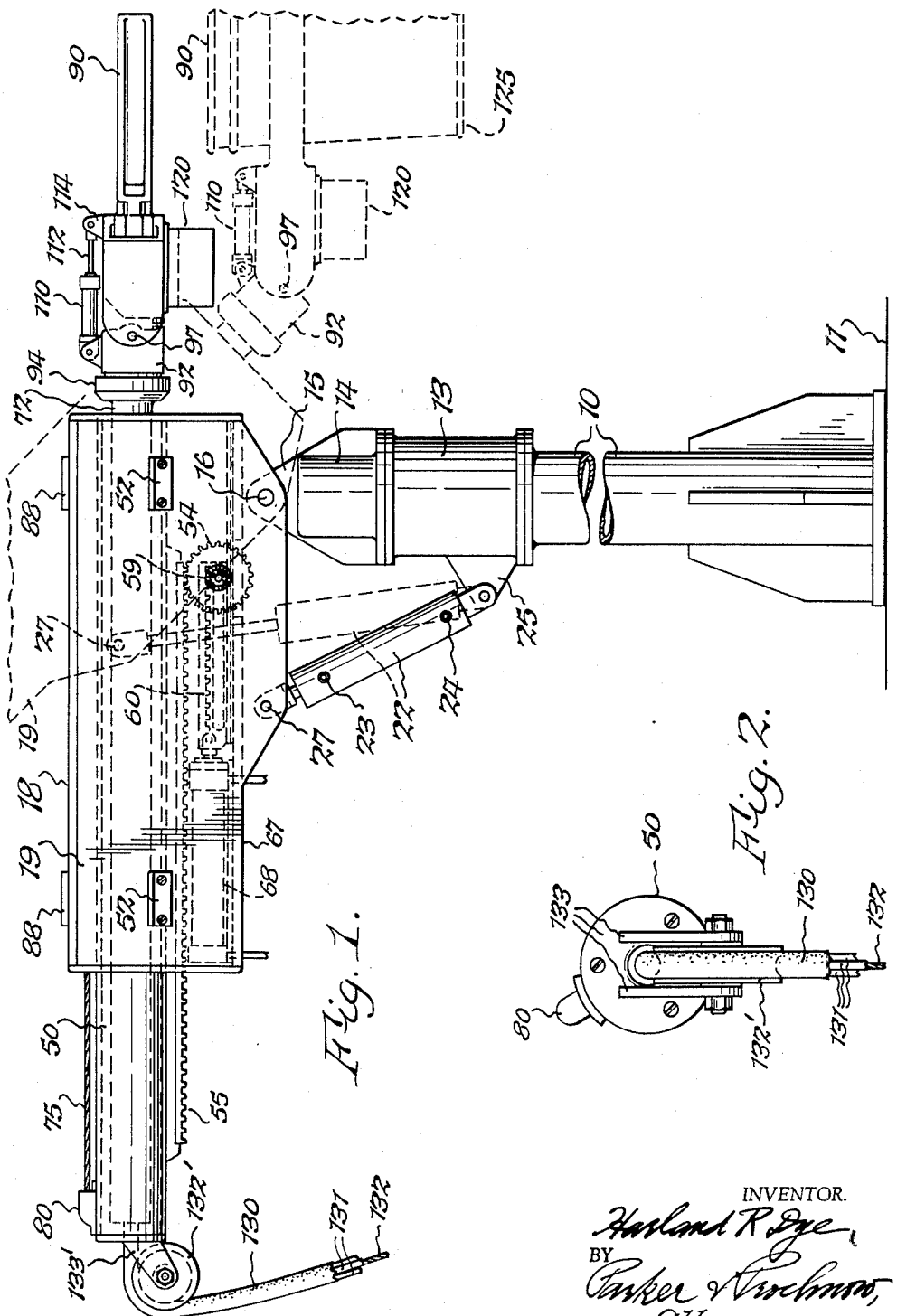

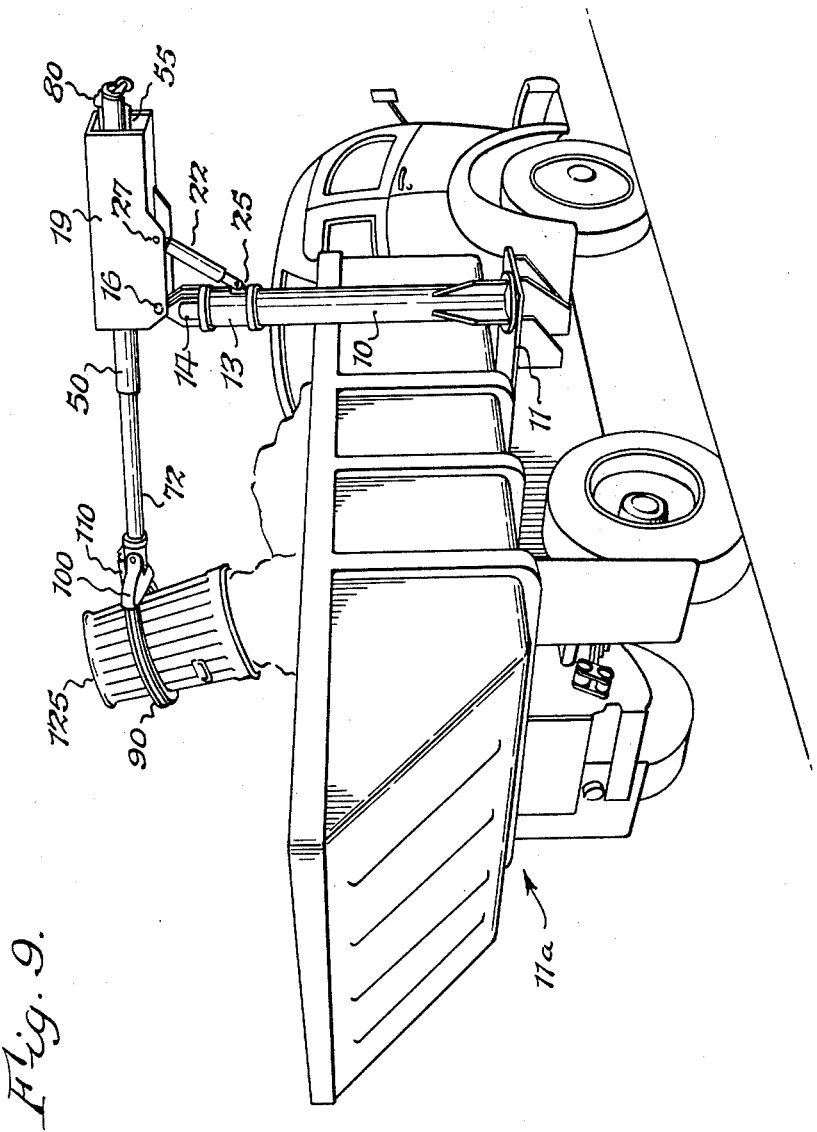

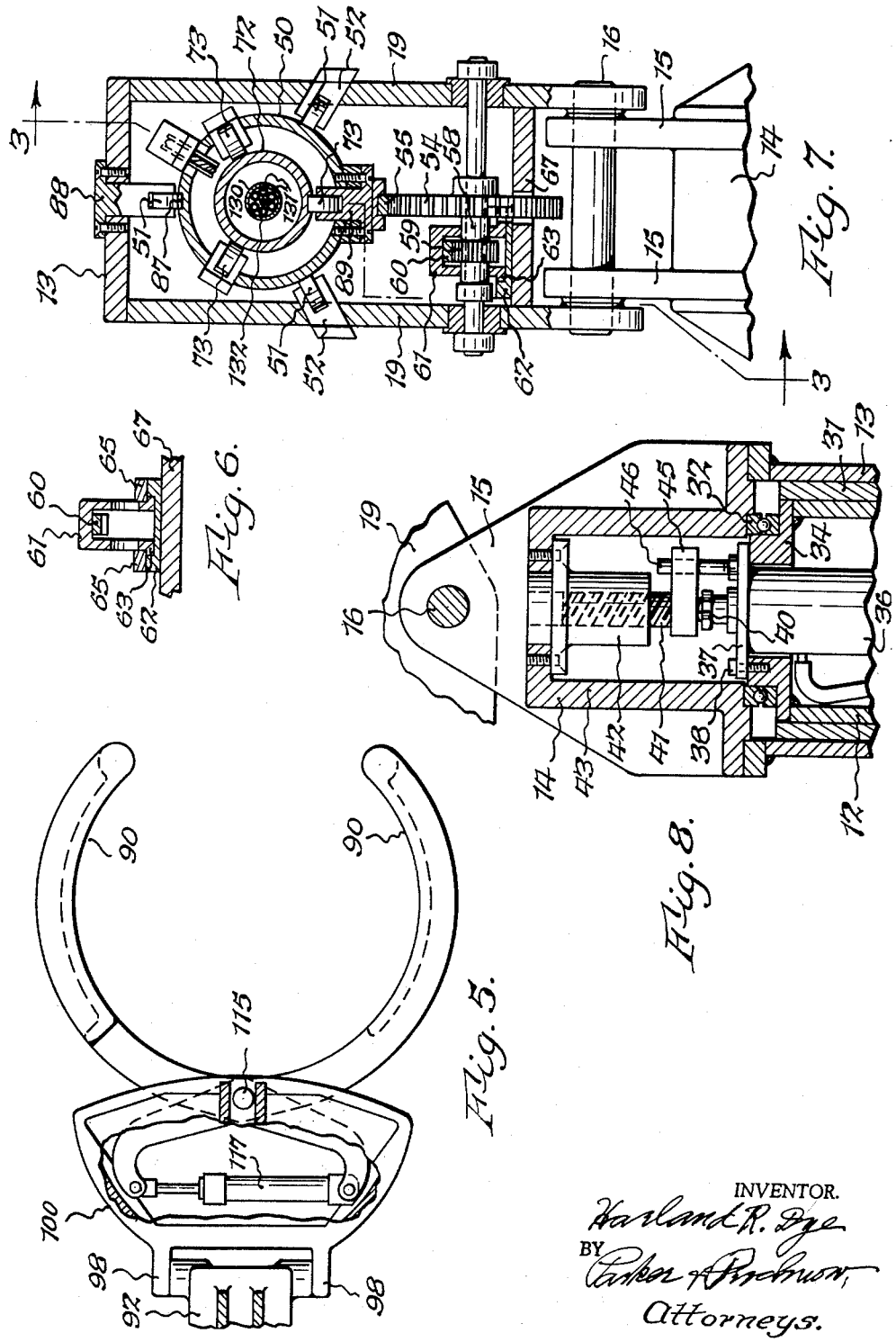

United States Patent Office 2,933,210
Patented Apr. 19, 1960

2,933,210

CONTAINER HANDLING AND DUMPING APPARATUS

Harland R. Dye, Buffalo, N.Y.

Application December 4, 1958, Serial No. 778,146

12 Claims. (Cl. 214—80)

This invention relates to apparatus for handling containers, such for example as garbage or trash cans, and for dumping the contents of the same.

Sheet metal containers in the shape of barrels or pails are commonly used in connection with the handling of many types of materials, and these containers may be inverted for dumping the contents. For example, garbage and trash cans are frequently of this substantially cylindrical shape and are generally raised manually to the edge of a truck and then dumped into the truck, and this operation generally requires two men.

One object of this invention is to provide handling apparatus which can be controlled by the driver of a truck or other operator for lifting a container and elevating it, and then dumping the contents into the truck.

It is also an object of this invention to provide a device of this kind by means of which the container, after it is emptied, may be again positioned at a side of the truck.

Another object is to provide a device of this type with means for removing a lid from a container prior to lifting the container for dumping its contents into a truck.

A further object is to provide a handling apparatus of this type which includes an arm provided at the outer end thereof with suitable jaws for grasping a container and which arm is movable in a direction to hoist the container and position it over a truck, and in which the arm includes another member which is rotatable to dump the contents of the container.

A further object is to provide an arm of this type which consists of a plurality of sections arranged one within the other and movable relatively to each other to extend or contract the length of the arm, at least one of the sections being rotatable to effect inverting of the container for dumping.

In the accompanying drawings:

Fig. 1 is a side elevation of an apparatus embodying this invention and showing in broken lines a container grasped by a portion of the apparatus.

Fig. 2 is an end view of the arm of the apparatus.

Fig. 3 is a fragmentary central sectional elevation thereof on an enlarged scale on line 3—3, Fig. 7.

Fig. 4 is a fragmentary side elevation of the container grasping end of the arm.

Fig. 5 is a fragmentary plan view thereof partly in section as seen on line 5—5, Fig. 4.

Fig. 6 is a fragmentary sectional view on line 6—6, Fig. 3.

Fig. 7 is a fragmentary sectional elevation thereof on line 7—7, Fig. 3.

Fig. 8 is a fragmentary central sectional view on an enlarged scale of the mechanism arranged on the upper end of the supporting column.

Fig. 9 is a perspective view showing a truck having my container handling and dumping apparatus mounted thereon.

The apparatus includes an upright post or column 10 which may be rigidly mounted on any suitable base. For example, the base may be in the form of a plate 11 mounted on a side of a truck 11a as shown in Fig. 9. If the truck is a dump truck, the part 11 is mounted on the stationary frame or chassis of the truck. The post or column 10 includes an extension 12 on the upper end thereof, Fig. 8, about which a rotary sleeve 13 is mounted to turn about the axis of the column, the sleeve 13 having a flange at its lower end resting on a flange on the upper end of the post. By means of this construction the post may be made of any desired height or shape and the handling and hoisting apparatus is mounted on the sleeve 13 which may consequently be applied to posts of various types and heights.

At the upper end of the rotary sleeve 13 an extension or cap 14 is provided which includes a pair of upwardly extending arms 15 provided with oppositely disposed holes through which a substantially horizontal pivot pin or shaft 16 for the container handling mechanism may extend. This mechanism includes a housing or partial enclosure of any suitable type having a top wall 18 and two downwardly extending sides 19 through which the pivot pin 16 extends to permit the housing to be rocked about the axis of this pin. This housing confines at least partly an expansible derrick arm or boom used in connection with my handling mechanism.

The adjustment of the housing about the axis of the pin 16 may be effected in any suitable manner, for example, by means of a fluid pressure actuated unit having a cylinder 22 containing the usual piston and having openings 23 and 24 for hose connections for admitting fluid under pressure to the cylinder. This fluid pressure actuated unit has one end, for example the cylinder end thereof pivotally connected to a bracket 25 extending outwardly from the sleeve 13 of the column, and the other end, which may for example be the piston end, is connected to a pivot 27 mounted on the side walls 19 of the housing or partial enclosure. The means for controlling the supply of fluid under pressure to the unit may, of course, be of any usual or suitable type, including a valve in a location accessible to the truck driver or other operator of the apparatus, and connected with a source of fluid pressure by means of tubes or conduits. These devices are commonly employed in connection with fluid pressure operated apparatus and it is consequently deemed unnecessary to illustrate these connections and operating means.

The housing and the parts mounted thereon, including the cylinder 13, can be turned about the vertical axis of the column 10 by any suitable means. In the construction shown for this purpose, the post or column 10 is provided with the upwardly extending cylindrical part 12 which forms a pivot about which the housing may swing and which is arranged within the sleeve 13. This pivot 12 is spaced from the sleeve by means of a cylindrical bearing 31. The cap 14 on which the horizontal pivot pin 16 is mounted is suitably secured to the rotatable sleeve 13 in any desired manner (not shown). The rotation of this cap and the sleeve 13 secured thereto is facilitated by a thrust 32 which rests upon a flanged sleeve 34 provided at its lower end with a flange which may be welded or otherwise secured to the upper pivot part 12 of the post or column. It will thus been that the cap 14 and the sleeve 13 are rotatable together about the column or post 10.

Any suitable or desired means may be employed for adjusting the cap 14 and the sleeve 13 about the axis of the post or column 10 to the extent necessary to pick up, discharge and again set down the containers. In the particular construction shown for this purpose, a cylinder 36 is provided which may be actuated by fluid pressure and which is mounted in any suitable manner on the fixed column 10. For example the upper end of the cylinder 36 may be secured to a disk or plate 37 which in turn is secured to the flanged sleeve 34, for example by means of bolts 38.

The cylinder 36 has a piston connected with a piston rod 40 which extends through the upper end of the cylinder and through the plate 37 and has an externally threaded rod 41 secured thereto and formed to engage with an internally threaded nut 42 secured to a cylindrical portion 43 of the cap 14. The threaded rod 41 and the thread in the nut 42 are of a high pitch variety so that if the threaded rod 41 is held against turning, the nut 42 will be turned by lengthwise movement of the rod, and this turn results in turning of the cap 14 and the sleeve 13. In order to prevent the threaded rod 41 from turning, the rod 41 is provided with a laterally extending arm 45 rigidly secured thereto and having an aperture in the outer portion thereof through which a pin 46 slidably extends, the lower end of the pin being rigidly secured to the stationary plate 37. The pin consequently holds the threaded stem against turning during the vertical movement thereof.

The operation of the mechanism for turning the upper part of the apparatus will be obvious since if fluid pressure is admitted to the cylinder 36 to move the piston rod 40 in one direction, the housing of the apparatus will be turned in one direction while movement of the rod in the reverse direction turns the housing in the opposite direction. The supply of fluid pressure to the cylinder 36 may be effected by remote control by valve means located in a position convenient to the operator of the apparatus.

The derrick arm or boom forming a part of my improved container handling mechanism may be of any suitable construction that shown by way of example including a cylinder or tubular member 50 which is guided for movement in the direction of its axis, for example, by means of wheels or rollers 51 suitably mounted on brackets 52 secured to the side walls 19 of the housing. Movement of the cylinder relatively to the housing may be provided by means of a gear 54 meshing with a rack bar 55 suitably secured on the lower part of the cylinder 50. The gear 54 is journalled on a shaft 57 having the ends thereof supported in the side walls 19 of the housing, the gear 54 being secured on a sleeve 58 securely mounted on the shaft 55 which is rotatably mounted in bearings in the side plates 19. A pinion 59 is also secured on the sleeve 58. This pinion and the sleeve on which it is mounted are rotated by means of a reciprocable rack bar 60 secured to a guide frame 61 of inverted U-shape which is slidable on a guide member 62 secured to a bottom wall 63 of the housing, see Figs. 1, 3, 6 and 7. This guide frame 61 has outwardly extending flanges 63 on its lower edges which are slidable in the guide member 62. Strips 65 secured to the guide member 62 and overlapping the flanges 63 hold the guide frame against movement relatively to the guide frame in any direction except lengthwise of the tubular member 50.

The rack bar 60 may be reciprocated in any suitable manner, for example, by means of a fluid pressure actuated member including a cylinder 68 suitably mounted on the base plate 67 of the housing. The piston, not shown, of this pressure actuated unit 68 is connected in any suitable manner to the rack bar 60, for example, by means of a coupling 69. The operation of this part of the mechanism will be obvious, since pressure admitted to one side of the cylinder 68 will move its piston in one direction to impart rotation to the pinion 59 which through the sleeve 58 rotates the gear 54, and this rotation of the gear 54 through cooperation with the rack bar 55 imparts longitudinal movement to the cylinder 50.

Within the cylinder 50 is provided an inner cylinder or tubular member 72. This inner cylinder may be guided for movement relatively to the outer cylinder 50 in any suitable manner, for example, by means of wheels or rollers 73 rotatably mounted on the outer cylinder 50. The procession of two telescopically arranged cylinders avoids making the mechanism excessively long.

The inner cylinder 72 is moved into and out of the housing simultaneously with the movement of the outer cylinder 50, and this, in the particular construction shown by way of example, is effected by means of a cable 75, the ends of which are suitably secured to a downward projection 77 mounted on the lower face of the upper wall 18 of the housing. This cable runs over grooved pulleys 78 and 79 journalled on the brackets 80 and 81 mounted on the outer cylinder 50. This cable is rigidly connected to the inner cylinder 72 in any suitable manner, for example, by means of a clamping device or hook 83. As a result of this construction it will be obvious that as the outer cylinder 50 is moved to the right, the pulleys 78 and 79 mounted thereon will cause the lower run of the cable 75 to move to the right in Fig. 3 and consequently through the clamp or connection 83, will cause the inner cylinder to also move outwardly. Any other means for moving the inner cylinder relatively to the outer cylinder may be provided if desired.

The inner and outer cylinders may be held against rotation in any suitable or desired manner. In the construction illustrated by way of example, the outer cylinder is provided lengthwise thereof with a groove or keyway 87 into which one of the rollers 51 extends. This roller is rotatably mounted on a bracket 88 secured to the top wall 18 of the housing and therefore serves the two-fold purpose of supporting the outer cylinder 50 during its lengthwise movement in the housing and also of preventing this cylinder from turning about its axis. A similar construction is used in connection with the inner cylinder 72, which is also provided with a groove or keyway extending lengthwise thereof and into which one of the rollers 73 extends. This roller is mounted on a bracket 89 secured on the outer cylinder 50. This bracket also forms a support for the rack bar 55. The roller 73 consequently also serves to support the inner cylinder 72 during its lengthwise movement and to prevent rotation of this cylinder. A derrick arm or boom of any other suitable or desired construction may be employed in place of the two telescopically arranged tubes.

The inner cylinder extends beyond the outer end of the outer cylinder 50 and is provided at the outer end thereof with means for rotatably supporting a pair of clamping jaws 90 which are formed to extend partially about and clamp a receptacle to be handled. These jaws must be mounted to swing through approximately 180 degrees so that the receptacles held by the jaws may be inverted to dump the contents. This may be accomplished in any suitable manner, and in the construction shown for this purpose, see particularly Fig. 4, I have provided on the outer end of the inner sleeve 72 an extension sleeve 91 rigidly secured thereto on which a tubular swivel member 92 is rotatably mounted, a bushing 93 preferably of bearing metal being arranged between the extension sleeve 91 and the swivel member 92. This swivel member 92 has a threaded part formed to cooperate with an internally threaded sleeve or nut 94 which has an inwardly extending flange bearing against the extension sleeve 91. This nut 94 consequently holds the swivel member 92 in desired relation to the extension sleeve 91. The swivel member for the jaws is provided with bearings or trunnions 96 through which a pivot pin 97 extends. The ends of the pivot pin also extend outwardly through lugs 98 of a jaw-supporting frame 100, Fig. 5.

In order to move the jaws into various angular relation about the derrick arm or boom, means are provided for turning the swivel member 92 relatively to the end of the inner sleeve 72. In the construction shown for this purpose, a fluid pressure operated cylinder 104 is provided which has a collar 105 suitably welded or otherwise secured to the extension sleeve 91, and this cylinder has a piston connected with a piston rod 106 having a high pitch threaded rod 107 which cooperates with an internally threaded nut 108 secured to the swivel member 92. Consequently by moving the piston rod 106 lengthwise the swivel member 92 is swung about the axis of the inner sleeve 72 in approximately the same manner as the sleeve 13 is rotated by the structure shown in Fig. 8. Suitable means (not shown) are of course provided for holding the piston rod 106 against turning about its axis.

The jaw-supporting frame 100 may be swung about the pivot pin 97 in any suitable manner to produce a wrist-like movement, and in the construction illustrated a fluid pressure actuated member is used for this purpose, this member including a cylinder 110 pivoted at one end on a pair of lugs 111 extending upwardly from the swivel member 92. The piston of this fluid pressure actuated unit has a piston rod 112 pivotally connected with lugs 114 mounted on the jaw supporting frame 100. Consequently this frame and the clamping jaws 90 may be swung about the axis of the pivot 97 by means of the pressure actuated unit including the piston 110.

The actuation of the clamping jaws 90 is best illustrated in Fig. 5. These jaws are pivoted at 115 and have arms 116 beyond the pivot 115, these arms being connected by means of a fluid pressure actuated unit 117. Consequently, by fluid pressure, the jaws 90 may be swung toward and from each other. This pressure actuated unit as well as the unit including the piston 110 may, of course, be controlled by suitable valves arranged in convenient relation to the operator of the apparatus, conduits for fluid under pressure being shown leading to both of these pressure actuated units in Figs. 3 and 4.

The containers to be handled frequently have covers or lids and for dumping the contents of the containers it is of course necessary to remove the covers so that they may be used again by the owners of the containers. For this purpose I have attached to the lower face of the jaw frame 100 a magnet 120 which is preferably an electro-magnet to which electric current may be conducted through conductors 121. When the apparatus is used, the jaw frame 100 is first lowered so that the magnet 120 becomes attached to a cover of the container whereupon the jaw frame is raised to remove the cover from the container. The supply of current to the magnet may be interrupted for dropping the cover.

The operation of the apparatus will be readily understood. If the same is mounted on a truck as shown in Fig. 9, the frame supporting the inner and outer tubes of the derrick arm may be tilted by means of the mechanism including the cylinder 22 to move the frame and telescoping tubes contained therein approximately into the dotted line position shown in Fig. 1. The two telescopically arranged tubes within the housing can then be lowered to bring the magnet 120 into operative relation to the lid of the container 125 which can then be removed as described. The mechanism is then actuated to bring the clamping arms 90 into position at opposite sides of the container, whereupon the power mechanism including the cylinder 117 is actuated to move the jaws toward each other to grasp the container 125. The container may then be raised by swinging the housing and the derrick arm or cylinders contained therein into approximately the full line position shown in Fig. 1 and above the level of the truck body shown in Fig. 9. The housing and mechanism are then rotated about the axis of the column 10 by means of the power mechanism including the cylinder 36, until the container is over the body of the truck or other location in which the contents of the container are to be dumped. The dumping is then effected by actuating the power unit 104 to produce rotation of the swivel member 92 and the jaws 90 whereby the container is entirely or partly inverted so that the contents will drop out of the same. The various mechanisms are then again actuated to replace the container on the ground.

While I have shown fluid pressure actuating means for operating the various parts of my improved mechanism, it will be obvious that electrical or other power means may be substituted if desired.

The various tubes 131 leading to the several fluid pressure operating units are preferably housed in a hollow flexible sheath or conduit 130 which preferably includes a cable or tension member 132 which takes up the strain resulting from the moving of the tubes and sheath with the parts of the derrick arm. This cable, for example, may be secured to any part of the inner tubular member of the derrick arm, for example, to the cylinder 104, Fig. 3. The flexible sheath with its tubes and the tension member passes into and out of the interior of the derrick arm over a pulley or sheave 132' supported by brackets 133' suitably secured to the rear end wall of the housing which supports the derrick arm.

It will be understood that various changes in the details, materials and arrangements of parts which have been herein described and illustrated in order to explain the nature of the invention may be made by those skilled in the art within the principle and scope of the invention as expressed in the appended claims.

I claim:

1. Apparatus for picking up containers and dumping the contents thereof into a truck, including an extensible derrick arm mounted on a side of the truck and having pivotal supports for permitting the outer end of said arm to move up and down and to swing about an upright axis, a pair of clamping jaws on the end of said arm movable into and out of positions to grasp a container, a frame on which said jaws are mounted and which is swivelled to swing about a substantially horizontal axis, and power actuated mechanism for swinging said swivelled frame about an axis substantially perpendicular to said first mentioned axis to invert said jaws and the container carried thereby.

2. Apparatus for picking up containers and dumping the contents thereof into a truck, including a column mounted on a side of the truck and having a sleeve mounted on the upper portion of said column and rotatable about a substantially vertical axis, an extensible derrick arm mounted on said rotatable sleeve to swing over said truck and to one side of said truck, a pivotal support between said sleeve and said arm for swinging the outer end of said derrick arm up and down, a pair of clamping jaws on the end of said arm movable into and out of positions to grasp a container, a frame on which said jaws are mounted, a pivotal mounting for said frame to swing the same on a substantially horizontal axis to maintain containers in substantially upright position while being lifted by said derrick arm, and power actuated mechanism for swinging said frame to invert said jaws and the container carried thereby.

3. Apparatus for picking up containers and dumping the contents thereof, including a truck, a derrick arm, means for pivotally mounting said derrick arm on said truck to move the outer end thereof to one side of said truck and over said truck, a pair of clamping jaws mounted on the end of said arm and movable into and out of positions to extend about and grasp a container, a frame on which said jaws are movably mounted, and power actuated means for swinging said frame to invert said jaws and the container carried thereby for dumping the contents of said containers into said truck.

4. Apparatus for picking up containers and dumping the contents thereof into a truck, including a pair of clamping jaws movable into and out of positions to grasp a container, a derrick arm including two parts one of which is movable outwardly beyond the other, said clamping jaws being mounted on said outwardly movable part, a pivotal mounting for said derrick arm for swinging the same about a substantially vertical axis for positioning said jaws at the side of said truck for picking up a container and into a position over said truck for inverting said container to dump the contents, and a swivel connection between said derrick arm and said clamping jaws for permitting swinging said jaws for inverting said container.

5. Apparatus according to claim 4 and including power actuated means for moving said outwardly movable part of said derrick arm relatively to said apparatus for positioning said clamping jaws in operative relation to said container.

6. Apparatus for picking up containers and dumping the contents thereof into a truck, including a column mounted on a side of the truck and having a sleeve mounted on the upper portion of said column and rotatable about a substantially vertical axis, power operated mechanism for swinging said sleeve relatively to said column, an extensible derrick arm, a pivotal connection on said rotatable sleeve on which said derrick arm is supported for swinging the outer end of said derrick arm up and down, a pair of clamping jaws on the end of said arm movable toward and from each other for grasping and releasing a container, power actuated mechanism for moving said jaws into and out of positions to grasp and release a container, and means on said derrick arm swinging said clamping jaws about an approximately horizontal axis to invert said container.

7. Apparatus according to claim 5 and including power actuated means for moving said clamping jaws about a substantially horizontal axis to effect dumping of the contents of a container.

8. Apparatus according to claim 5 in which pivotal means are provided about which said jaws may swing relatively to said derrick arm into substantially horizontal positions to grasp a container.

9. Apparatus for picking up containers and dumping the contents thereof, including a truck, a column mounted on a side of the truck and having a sleeve mounted on the upper portion of said column and rotatable about a substantially vertical axis, an extensible derrick arm mounted on said rotatable sleeve to swing over said truck and to one side of said truck, including a plurality of parts guided for movement lengthwise relatively to each other to extend the length of said arm outwardly, a substantially horizontal pivotal connection on said sleeve about which said derrick arm may swing in an up and down direction, a swivel member bearing on the outer end of said derrick arm by a pivotal connection having its axis substantially parallel to the length of said derrick arm, a jaw frame, a pivotal connection between said jaw frame and said swivel member extending in a direction substantially at right angles to the axis of the bearing between said swivel member and said derrick arm, a pair of clamping jaws mounted on said jaw frame to swing toward and from each other to grasp a container, and power actuated means for swinging said jaws into and out of container gripping positions, whereby said jaws can grasp a container standing at the side of said truck and raise the same and then swing the same over said truck and invert the container for dumping the contents thereof into said truck.

10. Apparatus according to claim 9 and including power actuated mechanisms at each of said pivotal connections for swinging the parts connected thereby relatively to each other.

11. Apparatus according to claim 2 and including a magnet mounted on the lower part of said clamping jaw frame in position to remove a cover from a container.

12. Apparatus according to claim 2 and including an electro-magnet secured to the lower part of said clamping jaw frame in a position to be placed upon a cover of a container and when energized and moved upwardly will remove a cover from a container, said electro-magnet when depolarized serving to drop said cover.

References Cited in the file of this patent

UNITED STATES PATENTS

| | | |
|---|---|---|
| 1,686,658 | Healey | Oct. 9, 1928 |
| 2,839,067 | Wilkinson | June 17, 1958 |
| 2,842,275 | Kughler | July 8, 1958 |
| 2,868,397 | Westling | Jan. 13, 1959 |